Figure 1:
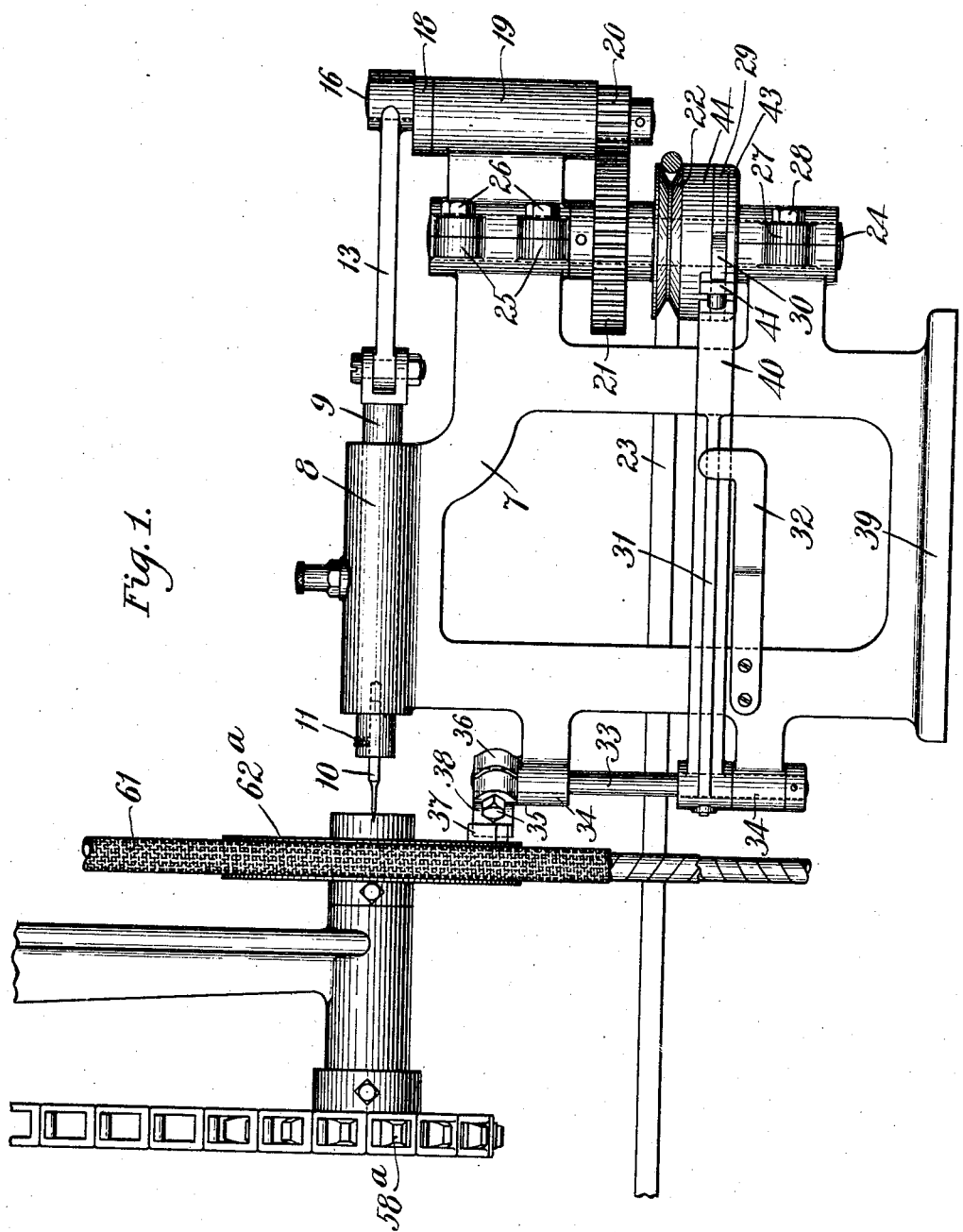

No. 893,674. PATENTED JULY 21, 1908.
C. THIBODEAU.
APPARATUS FOR PERFORATING TUBES.
APPLICATION FILED SEPT. 25, 1907.

2 SHEETS—SHEET 1.

Witnesses.
Everett N. Curtis
K. M. Sullivan

Inventor:
Charles Thibodeau.
by Chas. F. Perkins Att'y

No. 893,674. PATENTED JULY 21, 1908.
C. THIBODEAU.
APPARATUS FOR PERFORATING TUBES.
APPLICATION FILED SEPT. 25, 1907.
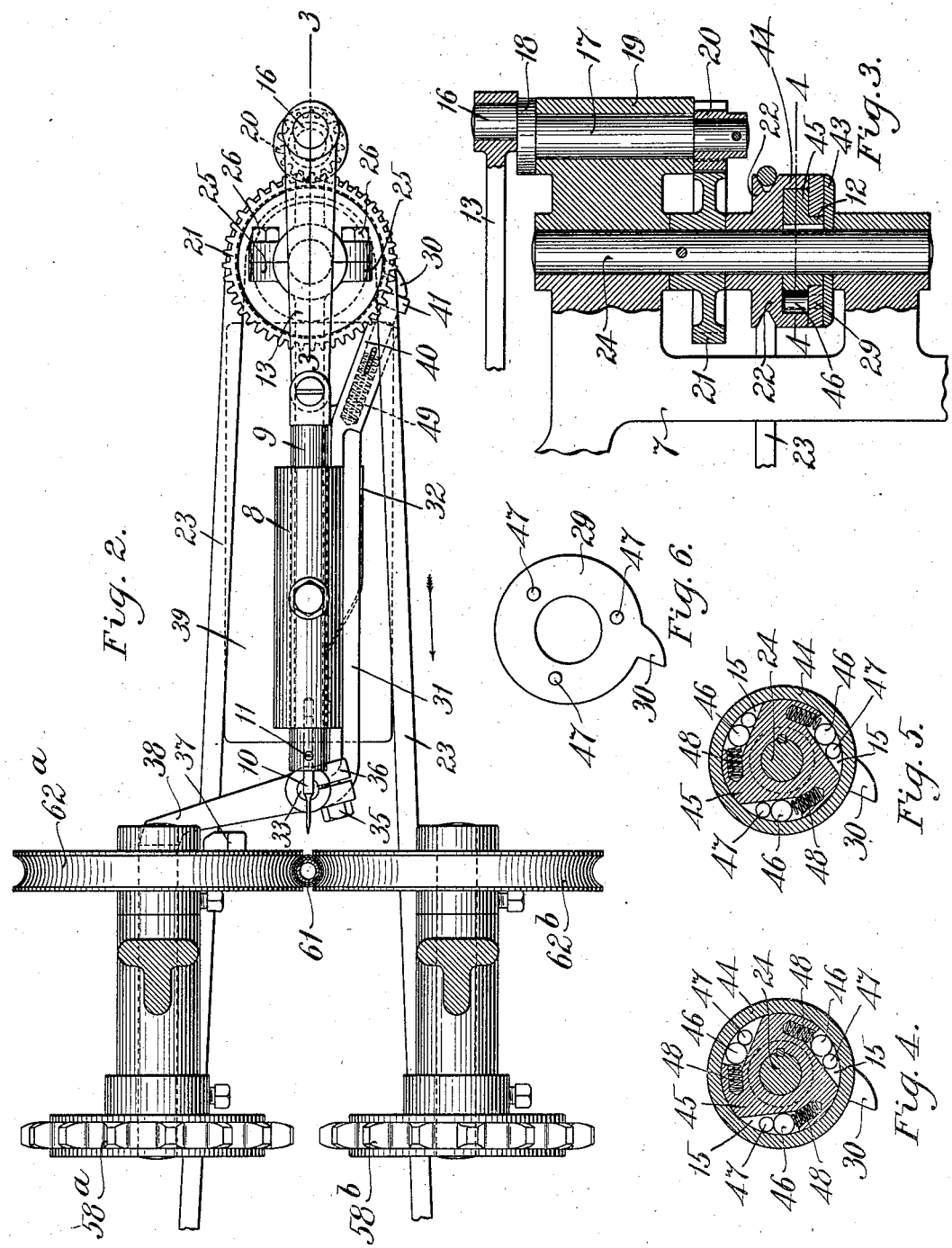
Witnesses.
Inventor:
Charles Thibodeau.

UNITED STATES PATENT OFFICE.

CHARLES THIBODEAU, OF CHELSEA, MASSACHUSETTS, ASSIGNOR TO AMERICAN CIRCULAR LOOM COMPANY, OF CHELSEA, MASSACHUSETTS, A CORPORATION OF MAINE.

APPARATUS FOR PERFORATING TUBES.

No. 893,674.      Specification of Letters Patent.      Patented July 21, 1908.

Application filed September 25, 1907. Serial No. 394,490.

*To all whom it may concern:*

Be it known that I, CHARLES THIBODEAU, a citizen of the United States, residing at Chelsea, in the county of Suffolk and State of Massachusetts, have invented new and useful Improvements in Apparatus for Perforating Tubes, of which the following is a specification.

My invention relates to apparatus for perforating tubes and its object is to weaken at intervals spiral linings of electric conduits.

My invention consists in mechanism for passing between two grooved rolls an electric conduit of the character described in United States patent to Herrick, numbered 456,271, dated July 21st, 1891, and for causing the wall of said conduit to be perforated by a sharp instrument at intervals while it is passing between said rolls, the purpose of said perforations being to weaken the spiral lining of said conduit and thereby cause the same to tear off in small sections when subjected to longitudinal pull or strain.

Reference is hereby made to the drawing in which similar numerals of designation refer to similar parts throughout the several views.

Figure 1 is a side elevation of my invention showing the various parts of my apparatus. Fig. 2 is a plan view of the apparatus shown in Fig. 1. Fig. 3 is a vertical section on line 3—3 of Fig. 2. Fig. 4 is a horizontal section on line 4—4 of Fig. 3. Fig. 5 is a view similar to Fig. 4 showing the friction disk in contact with the casing of the clutch. Fig. 6 is a detailed plan view of the rotary disk.

In the drawing, 7 is the main frame of my apparatus supported on the base 39.

$62^a$ and $62^b$ are grooved feed rolls engaging the electric conduit 61 and connected with gears $58^a$ and $58^b$ for the purpose of operating the same. On one side of the roll $62^a$ near the periphery thereof is located the pin or lug 37. On said frame 7 near the top thereof is located the guide 8 in which slides the awl handle 9, to one end of which is secured the awl 10 by means of the set screw 11 or other suitable means. The said awl handle is driven by the rod 13 which is connected with the pin 16 on the eccentric shaft 17. The said shaft 17 is journaled in the bearing 19 which is attached to the main frame by means of the flanges 25 and bolts 26. 18 is a flange integral with the said shaft and engaging with the top of the bearing 19. On the base of said shaft is mounted the gear 20 which meshes with the gear 21 on the shaft 24 mounted in suitable bearings. 22 is a pulley loosely mounted upon said shaft and having integral with the base thereof a casing 44 in which is located the friction disk 45, movable pins 46 and the springs 48. The said disk 45 is keyed to the shaft 24, and has portions of its periphery in contact with the wall of the casing, which portions normally remain stationary on said shaft while said pulley 22 is rotating. On the shank 12 integral with the said friction disk is mounted the revolving disk 29, bearing thereon the pins 47 which project upwardly into the casing 44. 30 is a detent on said revolving disk and normally engages with the buffer 41, the shank of which is secured to a spring 49 in the box 40. The box 40 is preferably made integral with the lever 31 which is mounted on the pivot 33 and turns with the same. 32 is a spring secured to said frame 7 in any suitable manner and serves to keep the buffer 41 in normal engagement with the detent 30. 34 are bearings on the main frame 7 having journaled therein the said shaft or pivot 33. At the top of said pivot is secured the arm 38 by means of the clamp 36 and bolt 35.

The mode of operation of my apparatus is as follows: The feed wheels are started in motion and the lug 37 caused to revolve and to come in contact at one point of its revolution with the arm 38, which is thereby moved outwardly from said roll $62^a$. The effect of said movement is to cause the buffer 41 on the arm 31 to become disengaged from the detent 30. Upon the detent 30 becoming released, the pins 47 on the revolving disk 29 cease to exert any pressure upon the pins 46 (see Figs. 3, 4 and 5) and each of the pins 46 is forced by the springs 48 into the narrow portion of the space 15, between the friction disk and the casing of the clutch, the effect of which operation is to force the pins 46 tightly between said disk and said wall and wedge the two securely together and thereby cause the pulley 22 to become secure to the shaft 24 and to rotate the same. The motion of said shaft is transmitted through the gears 21 and 20 to the shaft 17 and the handle 9 caused to move back and forth, the awl 10 thereby making successive holes or perforations through the walls of the tube 61.

When the lug 37 has passed the arm 38, the same resumes its normal position by reason of the spring 32 pressing upon the lever 31. The disk 29 then revolves until the detent 30 comes in contact with the buffer 41, and further movement is prevented. The effect of the arresting of the rotary movement of said disk is to cause each of the pins 47 to move forward in the space 15 and come in contact with the pins 46 and force them against the springs 48, at which time the friction disk 45 is released from its engagement with the casing 44 and the pulley 23 again caused to move loosely on the shaft 24.

What I claim and desire to secure by Letters Patent is:—

1. In a machine for perforating tubes, a pair of feed rolls, a pointed instrument, means for causing said instrument to reciprocate between said rolls, combined with means for automatically stopping and starting the motion of said instrument at predetermined intervals.

2. In a machine for perforating tubes, a pair of feed rolls, an awl carried upon an arm and arranged to reciprocate longitudinally between said rolls, a lug carried on the end of one of said feed rolls, combined with mechanism for causing said movement connected with a lever arranged to engage at intervals with said lug, and means for arresting the movement of said reciprocating arm when said lever is out of engagement with said lug.

3. In a machine for perforating tubes, a pair of feed rolls having their axes parallel to each other and having between their opposing edges an opening for the reception of a tube, a pointed instrument, means for causing the point of said instrument to reciprocate between said rolls across said opening, combined with means for automatically stopping the reciprocation of said instrument at predetermined intervals.

In testimony whereof I have hereunto set my hand in presence of two subscribing witnesses, this fourth day of September 1907.

CHARLES THIBODEAU.

Witnesses:
J. BUTLER STUDLEY,
EVERETT N. CURTIS.